April 15, 1952 G. E. GLISS 2,593,136
APPARATUS FOR EXTRUDING AND STRAINING COMPOUNDS
Filed May 21, 1949

INVENTOR
G. E. GLISS
BY *[signature]*
ATTORNEY

Patented Apr. 15, 1952

2,593,136

UNITED STATES PATENT OFFICE 2,593,136

APPARATUS FOR EXTRUDING AND STRAINING COMPOUNDS

George E. Gliss, Baltimore, Md., assignor to Western Electric Company, Incorporated, New York, N. Y., a corporation of New York Application May 21, 1949, Serial No. 94,646

2 Claims. (Cl. 18—13)

This invention relates to apparatus for extruding and straining organic compounds, and more particularly to apparatus for straining elastomer compounds as they are extruded into finished-article form.

In the manufacture of insulated conductors, elastomer compounds often are extruded into coverings around conductive cores, and are sometimes strained as they are so extruded. Strainers known hitherto have caused caking of the compounds passing therethrough, have been difficult to clean, and have seriously impeded flow of compounds therepast.

An object of the invention is to provide new and improved apparatus for extruding and straining organic compounds.

A further object of the invention is to provide new and improved apparatus for straining elastomer compounds as they are extruded into finished-article form.

Another object of the invention is to provide apparatus for straining vulcanizable compounds without causing caking of the compounds and without seriously impeding flow of the compounds, and which may be cleaned easily.

An apparatus illustrating certain features of the invention may include an extrusion cylinder having a bore therein, a stock screw rotatable in the bore for forcing plastic material through the bore and an extrusion head having an opening therein in communcation with the bore to form a passage therewith. The apparatus is provided with means for straining material which comprises a screen positioned in the passage, and a spider-like backing plate positioned in the passage for supporting the screen.

A complete understanding of the invention may be obtained from the following detailed description of an apparatus forming a specific embodiment thereof, when read in conjunction with the appended drawing, in which.

Figure 1:
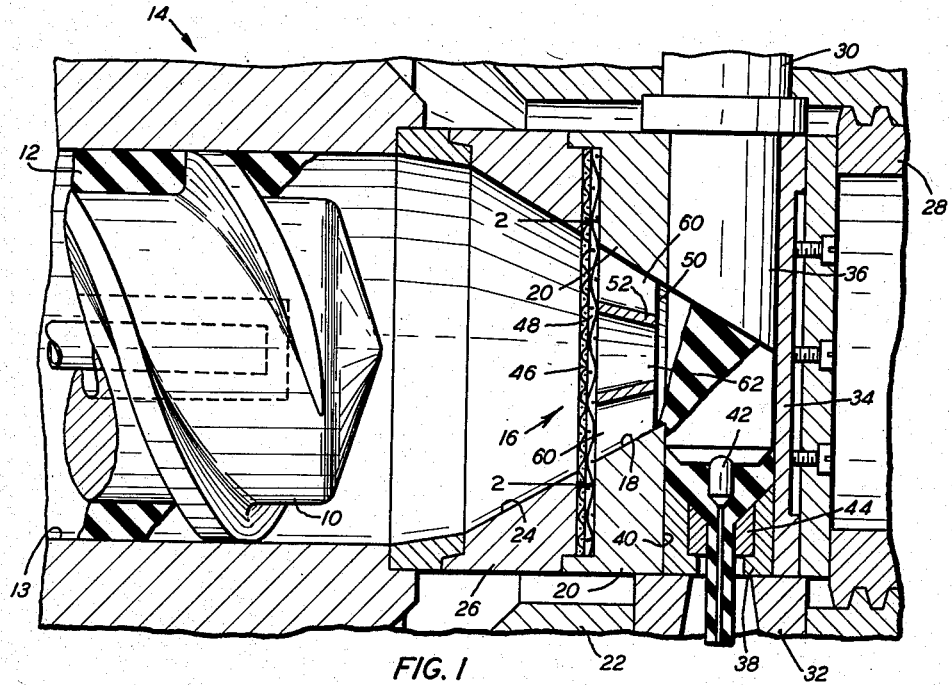
Fig. 1 is a fragmentary, horizontal section of an apparatus forming one embodiment of the invention.
Figure 2:
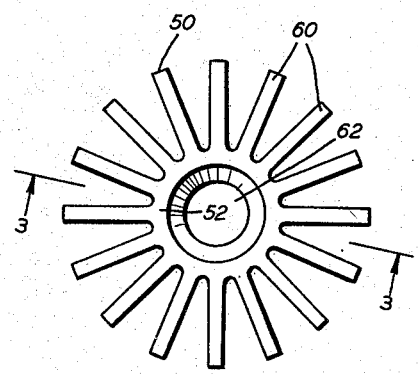
Fig. 2 is an elevation of a portion of the apparatus shown in Fig. 1.
Figure 3:
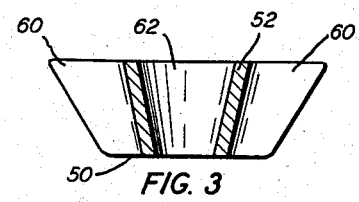
Fig. 3 is an enlarged section taken along line 3—3 of Fig. 2.

Referring now in detail to the drawing, a stock screw 10 forces a highly accelerated compound 12 including rubber, or a rubber-like material, as its essential ingredient along a bore 13 in an extruding cylinder 14 through a strainer 16 positioned in a tapered opening 18 in a tool-holder 20 in an extruding head 22 concentric with a tapered passage 24 in an adapter sleeve 26 aligned with the screw.

The tool-holder 20 is mounted removably in the head 22 by a nut 28 and bushings 30 and 32. An aligning plate 34 holds a core-tube-holder 36 and a die-holder 38 in alignment in a passage 40 in the tool-holder 20. The core-tube-holder 36 holds a core tube 42 in alignment with a die 44 held by the die-holder 38.

The strainer 16 includes a fine mesh straining screen 46, a coarse mesh backing screen 48 and a spider-like backing plate 50, which nests in the tapered opening 18. The backing plate 50 includes a generally annular, frustoconical central portion 52 and radial arms 60—60, which fit into the tapered opening 18. The central portion 52 has a passage 62 therethrough, and if desired could have a plurality of passages therethrough.

Operation

The compound 12 is forced continuously along the extruding cylinder 14 by the stock screw 10, and flows primarily along the portions of the tapered passage 24 near the periphery thereof with substantially lower velocity of flow in the central portion of the tapered passage. The compound is free to pass through the strainer in the outer portions of the tapered passage, the slots formed between the radial arms 60—60 permitting this flow, so that there is a minimum diversion of the major portion of the compound being forced through the extruding head. Hence, dead spots, that is, spots of stagnant flow of the compound, are minimized so that substantially all of the compound is flushed rapidly through the extruding head. The compound is formed into a covering around a conductive core, and is vulcanized in this form.

The radial, generally wedge-shaped slots formed between the arms 60—60 of the backing plate 50 provide flow-passages of large cross-sectional areas so that the compound flows through the backing plate 50 with a minimum obstruction, and the arms provide excellent support for the backing screen. Furthermore, the major portions of the areas of these flow-passages are aligned with the outer portion of the passage 24 along which inherently is the highest rate of flow of the compound.

The strainer may be removed with ease from the tapered passage 18 in the tool-holder 20, and the backing plate 50 is simple to clean, since the slots formed by the arms 60—60 are wedge-shaped and have open ends through which the compound may be pulled. Since the strainer 16 is located primarily in the tool-holder 20 (i. e., very close to the point of extrusion of the compound) and the compound is rapidly flushed through the tool-holder, heat imparted to the compound by the straining thereof will not cause vulcanization prior to extrusion of the compound. The above-described apparatus also is excellent for extruding and straining scorchy thermoplastic compounds, and will not scorch the thermoplastic compounds. The strength of the backing plate is not impaired during the formation thereof as often occurs in the formation of past-known backing plates.

What is claimed is:

1. An apparatus for extruding and straining plastic compounds, which comprises an extrusion cylinder having a bore therein, a stock screw rotatably mounted in the bore for forcing plastic compound along the outer portions of the bore, an extrusion head positioned at the discharge end of the cylinder and having a tapered passage generally aligned with and in communication with the bore, a backing plate having a tapered, tubular central portion and also provided with a plurality of arms having flat supporting-edges extending generally radially outwardly from the central portion and formed so as to nest in the tapered passage, a coarse backing screen supported by the backing plate in a position between the backing plate and the cylinder, and a fine straining screen supported by the coarse backing screen in a position between the backing screen and the cylinder.

2. An apparatus for extruding and straining plastic compounds, which comprises an extrusion cylinder having a bore therein, a stock screw rotatably mounted in the bore for forcing plastic compound along the outer portions of the bore, an extrusion head positioned at the discharge end of the cylinder and having a tapered passage generally aligned with and in communication with the bore, said head having an extrusion passage in communication with the discharge end of and extending transversely with respect to the tapered passage therein, a longitudinally tapered backing plate removably seated in the tapered passage near the discharge end thereof, the backing plate being provided with a plurality of transversely wedge-shaped slots extending from the periphery thereof generally toward the center thereof for permitting flow of compound therethrough and along the outer portions of the tapered passage in the head, a coarse backing screen supported in the tapered passage by the backing plate on the approach side thereof, and a fine straining screen supported by the coarse backing screen on the approach side thereof.

GEORGE E. GLISS.

REFERENCES CITED

The following references are of record in the file of this patent:

UNITED STATES PATENTS

| Number | Name | Date |
| --- | --- | --- |
| 2,471,324 | Henning | May 24, 1949 |

FOREIGN PATENTS

| Number | Country | Date |
| --- | --- | --- |
| 269,761 | Great Britain | July 3, 1926 |